United States Patent
Moran et al.

(10) Patent No.: US 6,188,696 B1
(45) Date of Patent: Feb. 13, 2001

(54) METHOD OF OPERATING A COMMUNICATION NETWORK TO PROVIDE LOAD BALANCING

(75) Inventors: Paul J. Moran, Hemel Hempstead; Richard A. Quine, St. Albans, both of (GB)

(73) Assignee: 3Com Technologies, Georgetown, KY (US)

( * ) Notice: Under 35 U.S.C. 154(b), the term of this patent shall be extended for 0 days.

(21) Appl. No.: 09/035,807

(22) Filed: Mar. 6, 1998

(30) Foreign Application Priority Data

Mar. 14, 1997 (GB) .................................................. 9705296

(51) Int. Cl.[7] ........................................................ H04J 3/12
(52) U.S. Cl. ................................................................ 370/410
(58) Field of Search ..................................... 370/410, 401, 370/445, 450, 381, 382, 446, 447, 461, 501, 229, 230, 240, 243, 245, 246, 293, 406, 407, 408, 425, 256, 254, 253, 252, 369, 370, 351, 352, 360, 522; 340/825.5, 825.79, 825.8

(56) References Cited

U.S. PATENT DOCUMENTS 5,936,962 * 8/1999 Haddock et al. .................... 370/501
5,999,538 * 12/1999 Haddock et al. .................... 370/501

FOREIGN PATENT DOCUMENTS

| 0615362 A1 | 9/1994 | (EP) . |
| 0701347 A2 | 3/1996 | (EP) . |
| WO 96/29802 | 9/1996 | (WO) . |

* cited by examiner

Primary Examiner—Dang Ton
(74) Attorney, Agent, or Firm—Nixon & Vanderhye P.C.

(57) ABSTRACT

A method for operating a multi-segment repeater hub wherein at least some of various signal ports connecting signaling stations to the hub can be connected selectively to different segments of the hub, comprising: monitoring signal traffic between the stations and the hub and thereby establishing a database which indicates for each of a plurality of ports the volume of signal traffic between the respective port and each other port in said plurality and any segment through which any of said signal traffic flows and to which a port other than a port in said plurality is connected, computing the traffic to and from the ports in said plurality and said segments and the traffic between the segments for each of a plurality of possible configurations in each of which a selected port is notionally moved from connection to one segment to connection with another segment; computing according to selected criteria a preferred set of connections to the ports to the segments, and switching the connections of the ports and segments to establish said set of connections.

6 Claims, 4 Drawing Sheets

METHOD OF OPERATING A COMMUNICATION NETWORK TO PROVIDE LOAD BALANCING

FIELD OF THE INVENTION

This invention relates to communication networks and in particular to a network which includes at least one multi-segment 'Ethernet' repeater hub, that is to say, a multi-segment hub comprising at least two repeater segments and a multiplicity of ports to which end stations or other hubs may be attached. Such a multi-segment hub has an internal switching matrix that allows any port to be coupled to any repeater segment.

BACKGROUND OF THE INVENTION

Such a hub is organised so that for each segment or repeater conflict between transmissions is resolved by a carrier-sense multiple access technique, which is well established in the art and is the essence of an 'Ethernet' communication system. A station wishing to transmit will first detect whether there is a carrier signal present in the segment to which it is connected and will either not transmit or will wait until an end of transmission is detected and then transmit its signal packet.

It is known that a system which resolves signal contention in this manner is subject to difficulties in conditions of heavy loading. This is particularly true for an Ethernet hub wherein, for example, there is signal traffic between stations connected to different segments which are connected via a bridge, because traffic is then subject to a plurality of possible contentions.

Multi-segment hubs of this character commonly include an internal switching matrix by means of which any port can be connected to any segment. It is therefore possible to contemplate measuring the traffic across the ports and controlling the connections so as to equalize the traffic across the segments. One such technique computes the volume of traffic through each segment in a given period of time and reallocates the ports connected to those segments to provide, so far as possible, an equalization of the traffic through the segments.

One disadvantage of such a technique known as octet-based load balancing, is that there tends to be a dispersal of end stations within a work group, so that forms an initial condition, wherein a multiplicity of stations forming a work group are connected to the same segment, at least some of the stations in such a work group have their ports associated with different repeaters. It will thus be apparent that there is a high likelihood that a given packet will appear on two segments, that is to say the segments connected via respective ports to the source and destination of the packet, and therefore the traffic across the bridge between segments remains high.

SUMMARY OF THE INVENTION

The present invention is primarily concerned with an improved method of allocating ports to segments based on the collection of data representing the traffic through the multi-segment hub. The technique involves computing, for a multiplicity of ports in turn, preferably starting with the busiest, the effect of moving the port to each of the participating segments and evaluating the effect in terms of the utilization of segments and the volume of inter-segment bridging for each possible or selected position of the port. The solutions may be compared against the 'best so far'.

Further candidate solutions may be generated by computing the effect of moving the next busiest port to a variety of segments. In this way, one may generate a 'tree' in which each node is a possible solution to the load balancing problem. Theoretically, if all possible movements of ports were considered, the tree would have depth 'n' where 'n' is the number of ports and the total number of possible solutions would be m exp (n) where m is the number of segments. It will be apparent that the number of solutions becomes unmanageably large for practical networks, where m may be substantially more than 2 and n is large. Accordingly, one may limit the depth of descent of the tree, since less busy ports will affect the result less significantly, and one may limit the number of solutions pursued at each level in the tree. A chosen solution is the one yielding the best feasible result.

The invention requires for its performance a means of collecting data representing the traffic between ports and the segments that the traffic utilizes and a programmed data processor which can evaluate that data and ultimately control the internal switching matrix to govern the allocation of the ports to the segments in accordance with the chosen result. Such a memory and data processor are themselves commonplace parts of a hub of this character, the invention lies in the process which is implemented by the processor and associated memory.

DETAILED DESCRIPTION OF A PREFERRED EMBODIMENT

Figure 1A:
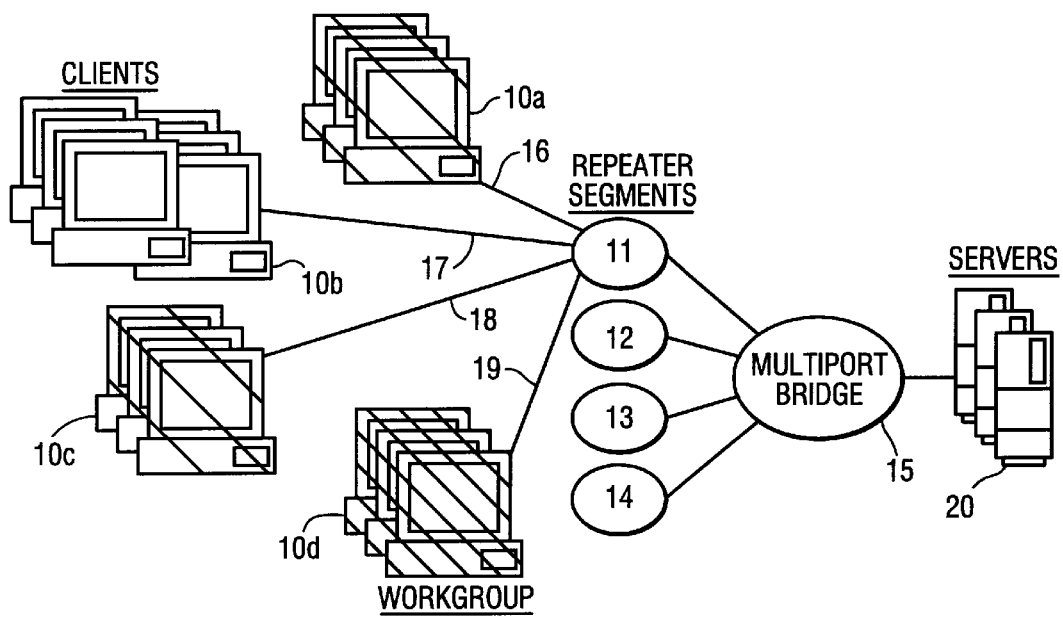
FIGS. 1a, 1b and 1c illustrate three configurations of a network wherein various work stations are differently connected to repeater segments of an Ethernet hub.

FIG. 1a illustrates an 'Ethernet' multi-segment hub and an associated network of work stations arranged in work groups 10a–10d. An Ethernet hub and an associated network of this character are well known and therefore will not be described in detail. The hub comprises a plurality of repeater segments, illustrated by the segments 11 to 14 in FIG. 1a, and a multi-port bridge 15 connecting the segments. Associated with the repeater segments is a passive switching matrix which in accordance with known practice, can couple any of a plurality of ports (illustrated herein by the lines 16 to 19) to any of the repeater segments. Devices or stations in the work groups are connected to the relevant ports. The bridge 15 also connects the segments and thereby the work stations, to file servers, illustrated conventionally at 20.

FIG. 1a shows a condition in which all ports in use are connected to a repeater segment 11. This is obviously likely to produce very high loading and therefore a high probability of packet contention in repeater segment 1.

Figure 1B:
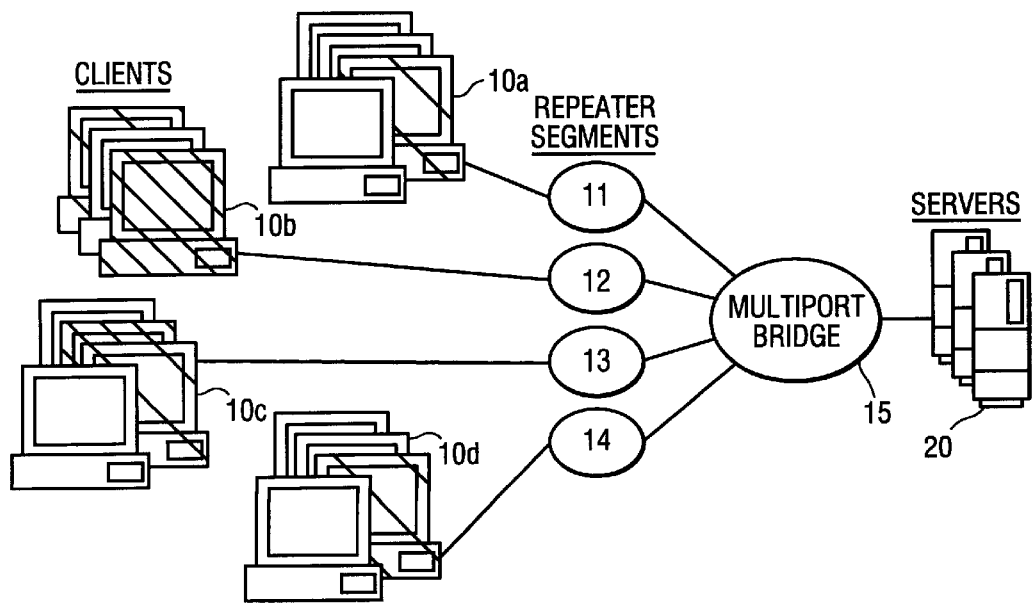

FIG. 1b illustrates the effect of a known technique of load balancing of the repeater segments. The ports are redistributed so as to apparently equalize the load or traffic through each repeater segment. In general however this will produce dispersion of the work stations in the sense that the different work stations in a group will be allocated to different repeater segments. The general effect of a process illustrated in FIG. 1b is that although there may be an approximate balance or equalization of the traffic through the segments there is duplication of packets in the segments in that a packet received at segment 11 will, most of the time, be re-transmitted by way of one of the other three repeater segments after having passed through the switch 15. Moreover, the equalization of the traffic through the segments does not minimize the possibility of packet contention. A higher proportion of traffic crosses the bridge and the aggregate traffic is higher.

Figure 1C:
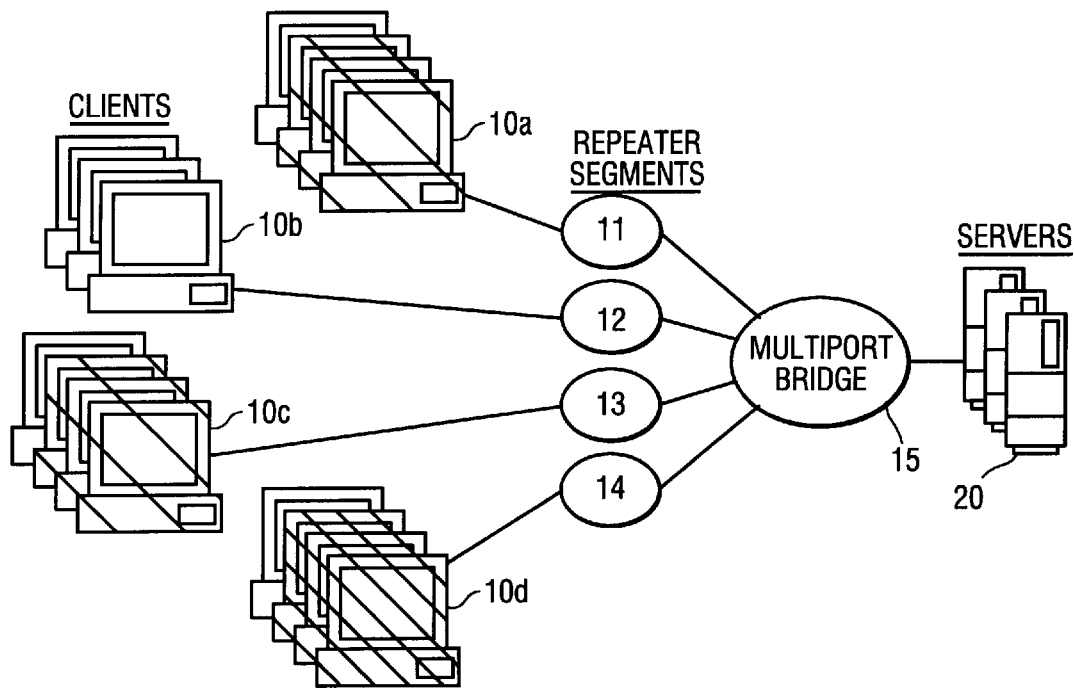

FIG. 1c illustrates one possible result of a technique according to the invention. The general aim is to find a process which will maximize the chances of placing the ports whereby heavy traffic remains on the same segment and is not passed from segment to segment. Of course, a perfect solution cannot be obtained without prior knowledge of the precise loading but the algorithm presented herein is intended to achieve a better load balancing than that described with reference to FIG. 1b.

The technique naturally divides into two parts, namely the collection of the required statistical database and then the load balancing algorithm or process which includes a determination of an optimal solution of the allocation of ports to segments.

Figure 2:
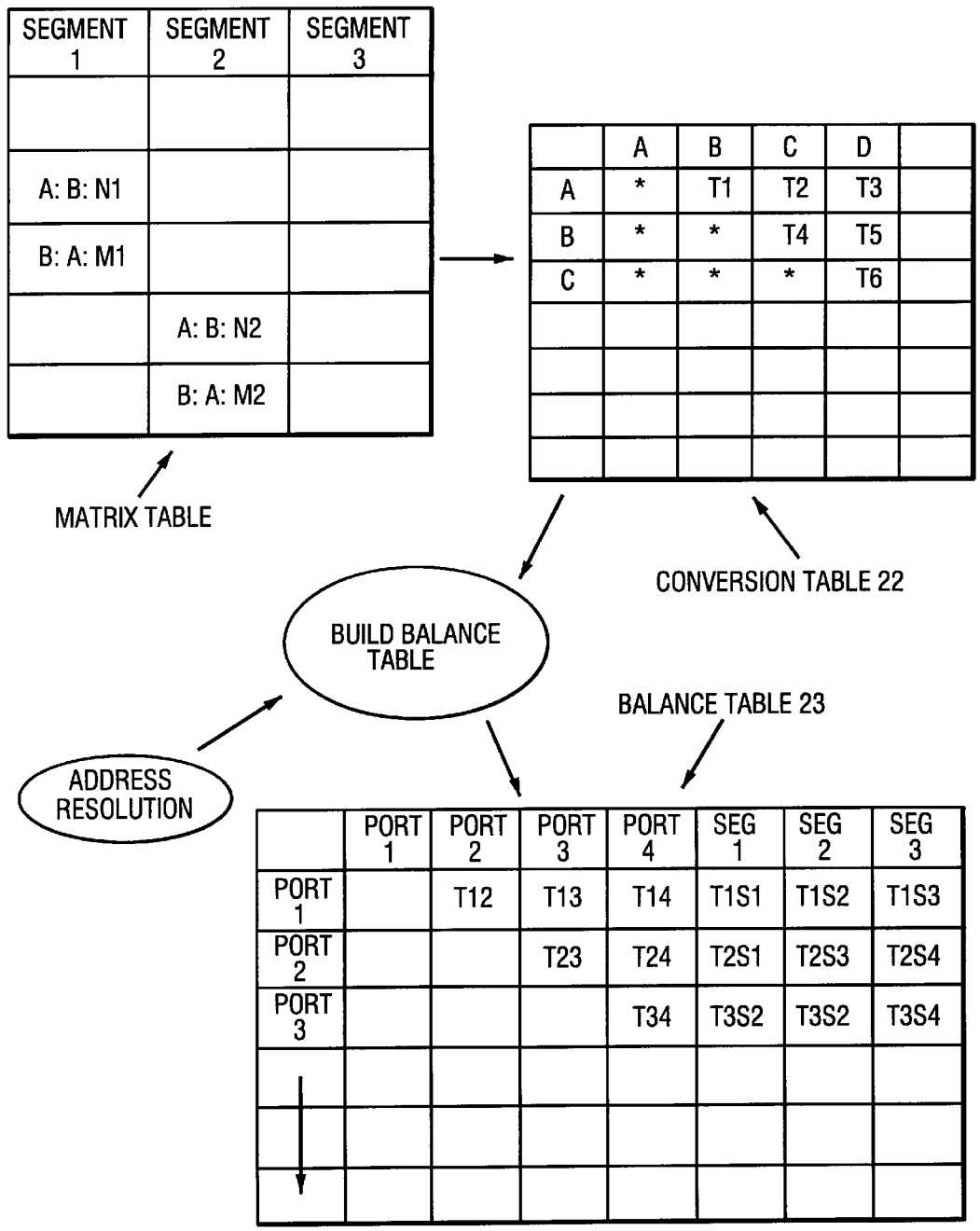
FIG. 2 illustrates schematically a data collection process which provides the basis for the present invention.

FIG. 2 illustrates schematically the data collection phase.

Since all proper traffic in a communication network of this general character consists of packets of a defined length and the packets identify source and destination, it is possible (and known practice) to build a database, commonly called a RMON matrix table 21, which consists of one 'column' per repeater segment. The entries in each column are in the general form A:B:N and B:A:M, wherein A represents a source, B represents a destination and N represents the octet count, this is to say the quantity of data measured in bytes, passing by way of that segment from source A to destination B. Since the traffic is bidirectional, there is also a count of the traffic M passing from station B to station A. Typically, a table of this character establishes a pair of entries in each column for each pair of station that exchanges information by way of the relevant segment and then increments the counts M and N when further traffic between stations A and B is detected in the respective segment.

From the matrix table 21 may readily compute entries for a new table, called herein conversation table, which comprises a bidirectional record of octet (byte) counts between address pairs. This table may be understood in the form of a multiplicity of columns, each for a pair of stations, and containing the aggregate of the traffic between the two stations in each pair. The conversation table can be readily built from the matrix table by discovery of each of the different pairs of stations and taking the sum of the traffic in the two directions between those two stations. Since the matrix table may contain entries in more than one column relating to the same pair of stations, one should take the highest value of the traffic in the respective direction between a given pair of stations to produce the required value in the conversation table.

For convenience, the conversation table 22 is shown as a cross-table with rows and columns allotted to the stations A, B, C etc. The entries would form a triangular array, in which T1 is the total traffic (octet count) between A and B, T2 is the total traffic between A and C and so on.

Preferably, though not essentially, a plurality of conversation tables can be built, each representing the bidirectional traffic between address pairs in a fraction of a data collection period. For example, four conversation tables, each built over one-quarter of a data collection period, may be established. Typically a data collection period may be one hour so that each table is built in respect of fifteen minutes' traffic. The four tables would be aggregated at the end of a data collection period. Accordingly the system may, on command from a user, perform load balancing in the middle of a data collection period. The data in the oldest table would be cleared after use but three-fourths of the data (in this example) would always be available for the computation of load balancing.

An important step in the invention is the development of a balance table from the conversation table. The balance table is intended to be a record of bytes or octet counts between all ports and all other relevant ports and segments. The production of the balance table requires for each address pair, the identification of the port or segment associated with each address. This identification is achieved by means of the address resolution phase shown in FIG. 2.

All the ports shown in the balance table 23 are local to the unit. It should be remembered that units of this type are stackable such that each can connect to repeater segments that cascade from unit to unit. There is a one-to-one relationship between repeaters on a unit and segments on the cascade. Thus, consider station A (connected to local port) that is conversing with Station B, which connects to a port on another unit in the stack. The load balancing technique cannot control which segment station B connects to. However, we do have to consider traffic to station B via that segment as it may affect a decision concerning the connection of Station A. Thus, the table refers to the volume of traffic between a local port and stations connected to a segment via remote units. This traffic is shown in the 'segment' columns Seg 1, Seg 2 etc. As will become apparent, the segment associated with a local port is part of the mapping that represents a solution.

Figure 3:
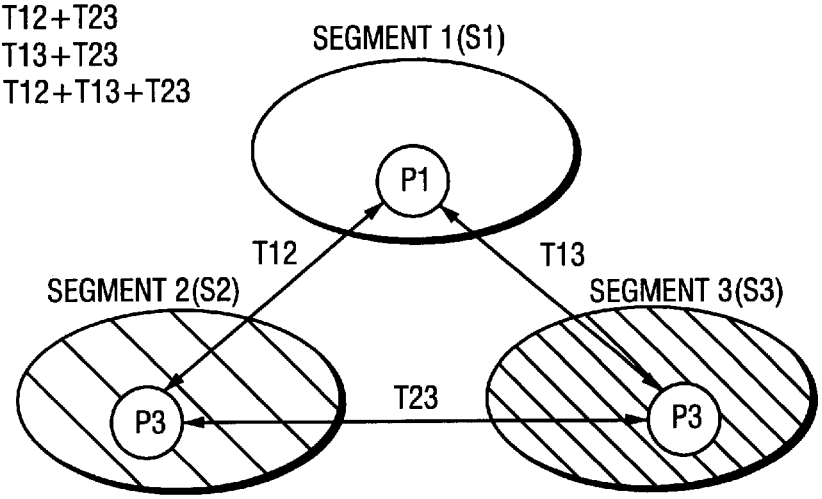
FIG. 3 illustrates a multi-segment hub in one condition.
Figure 4:
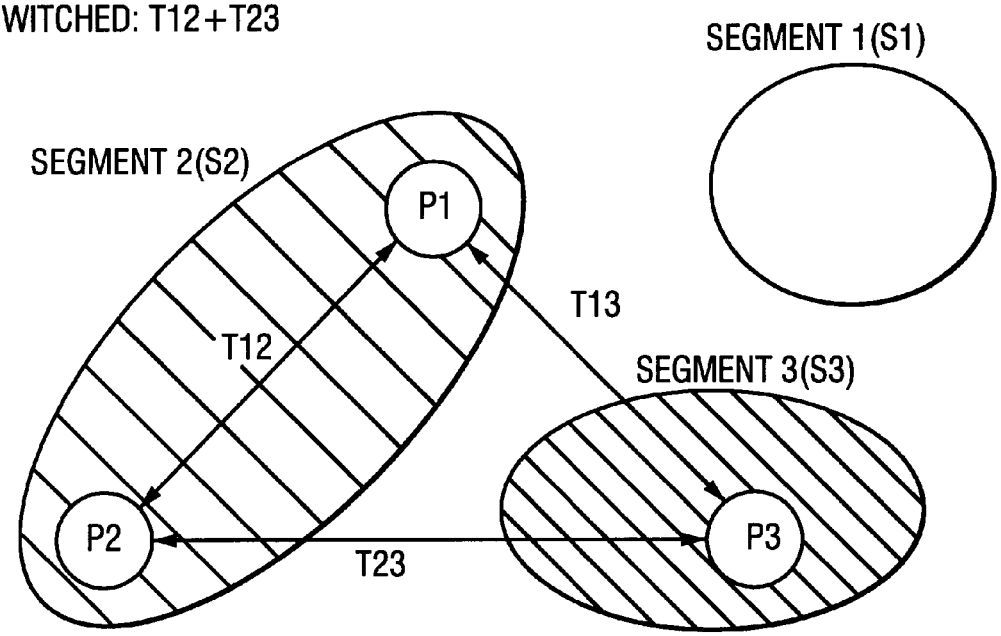
FIG. 4 illustrates the multi-segment hub in another condition.

The balancing process will be more easily understood by reference to FIGS. 3 and 4.

FIG. 3 shows a simplified example of an Ethernet hub having three segments S1, S2 and S3. The port P1 is connected to the segment S1. The port P2 is connected to the segment S2 and the port P3 is connected to the segment S3. For simplicity the effect of stacking units is ignored. In practice that effect is equivalent to a dedicated port which cannot be shifted from the segment to which it is connected. Traffic between such a port and segment needs to be considered in the computation of load balancing but the effect of shifting the port may obviously be omitted.

On FIG. 3 are superposed octet counts obtained from the balance table 23. In FIG. 3, the count T12 and T13 represent the traffic, in either direction, during a balancing period between port P1 and ports P2 and P3 respectively, whereas T23 represents the traffic between ports P2 and P3. From this it may readily be seen for each mapping of ports to segments (i.e. each solution) the aggregate traffic on each segment and across the switch (i.e. the bridge) can easily be derived by adding the appropriate values in the balance table.

It will also be apparent from FIG. 4 that load balancing would be achieved if the aggregate traffic on all segments were equal and aggregate traffic between the segments were a minimum. In practice, such a balance is unlikely or impossible but the use of the balance table enables a search process which should provide an optimal condition, that is to say the probably best balanced condition.

Another important stage in the present invention is the calculation of the effect of remapping the ports to the segment, namely calculating the effect on the traffic to and from the segments and the intersegment traffic if any of the ports were shifted to a different segment.

FIG. 4 illustrates the effect, relative to the condition shown in FIG. 3, of shifting port P1 so that it (and the end stations connected to it) is coupled to segment S2.

It may be seen that the aggregate traffic on segment S1 has been diminished by (T12+T13) whereas the total traffic on segment S2 has been increased by T13. Furthermore, intersegment traffic has been diminished by T12. It should be said that is example represents only traffic originating from and destined for ports local to the unit; stacking is excluded for the sake of simplicity.

The load balancing process may therefore be performed by computing the effect of moving each of succession of ports from a segment to which they have been connected to new segments and computing, in each case, the total external traffic into or out of the segments and the inter-segment traffic by simple extension from the examples given above.

There are a variety of ways in which the search may be organised. A theoretically complete search could be performed by first considering the busiest port and computing the effect of moving it to each of the other segments. Then one may consider the next busiest port and computer for each of those candidate solutions a second order solution wherein the second port is connected to each of the different segments. Tertiary solutions may be generated by considering the third most busy port and computing for each of the secondary solutions in each of which the third port is connected to a respective segment.

In practice, such a search would require consideration of m exp (n) solutions, which may well be impractical if either m or n is large. In practice therefore one would limit the investigation arbitrarily either by restricting the depth of the search, so that only movement of the first few, busiest ports, were considered or by adopting a search criterion which would stop the search when some predetermined acceptable balance condition applied.

Restricting the depth of the search would be justifiable on the assumption that the less busy ports made less contribution to imbalance. A search criterion, prescribing some predetermined condition of acceptable balance, would probably be necessary in any event.

For example, one may compute for each candidate solution the smallest and largest of the values of aggregate segmental traffic and reject all those solutions wherein the difference or percentage difference between the smallest and largest were greater than for the current configuration of ports and segments. Alternatively, one could adopt that solution which produces a minimum of intersegment traffic. A mixture of the two processes could be adopted, for example by taking the three best candidate solutions in terms of the percentage difference between the smallest and largest segmental traffic flows and computing which has solution gives the least intersegment traffic.

It will be apparent to those skilled in the art that a variety of search strategies to find the best likely solution is possible and that different search strategies may be adopted for different conditions of loading. Further, since there may be circumstances in which certain ports must be associated with certain segments, the search strategy does not necessarily require the movement of all ports or the consideration of the movement of any given port to any given segment.

As a final stage in the control process, the internal switching matrix would be controlled in accordance with the best computed solution to shift the switching connections so that the ports are connected to the segments in accordance with the desired solution. The traffic is then monitored as before. New version of the conversation table and the balance table may be built up and the balancing process may be repeated at such intervals as may be desired.

We claim:

1. A method for operating a multi-segment repeater hub wherein at least some of various signal ports connecting signaling stations to the hub can be connected selectively to different segments of the hub, said method comprising:

monitoring signal traffic between the stations and the hub and thereby establishing a database which indicates for each of a plurality of ports the volume of signal traffic between a respective one of said ports and each other port in said plurality and any segment through which any of said signal traffic flows and to which a port other than a port in said plurality is connected;

computing the traffic to and from the ports in said plurality and said segments and the traffic between the segments for each of a plurality of possible configurations in each of which a selected port is notionally moved from connection to one segment to connection with another segment;

computing according to selected criteria a preferred set of connections of the ports and the segments; and switching the connections of the ports and segments to establish said preferred set of connections.

2. A method according to claim 1 wherein computing the traffic comprises computing the traffic for each possible connection of a busiest port to each of the said segments to provide a plurality of candidate sets and for at least some of said candidate sets computing further candidate sets for each of a possible connection of another port to each of a plurality of the segments.

3. A method according to claim 2 wherein the selected criteria include minimization of the traffic between the segments.

4. A method according to claim 2 wherein the selected criteria include substantial equalization of external traffic which flows to and from each of the segments.

5. A method for operating a multi-segment repeater hub wherein at least some of various signal ports connecting signalling stations to the hub can be connected selectively to different segments of the hub, said method comprising:

monitoring signal traffic between the stations and the hub and thereby establishing a database which indicates for each of a plurality of ports the volume of signal traffic between a respective one of said ports and each other port in said plurality and any segment through which any of said signal traffic flows and to which a port other than a port in said plurality is connected;

computing the traffic to and from the ports in said plurality and said segments and the traffic between the segments for each of a plurality of possible configurations in each of which a selected port is notionally moved from connection to one segment to connection with another segment;

computing according to selected criteria a preferred set of connections of the ports and the segments, said selected criteria including minimization of traffic between segments and substantial equalization of external traffic flows to and from each of the segments wherein computing the traffic includes:

computing the traffic for each possible connection of a busiest port to each of the said segments to provide a plurality of candidate sets and for at least some of said candidate sets computing further candidate sets for each of a possible connection of another port to each of a plurality of the segments; and switching the connections of the ports and segments to establish said preferred set of connections.

6. A method for operating a multi-segment repeater hub, said method comprising:

monitoring signal traffic between ports and between segments of the hub and maintaining a database representative thereof;

using said database to computer possible changes to the traffic between the ports and segments for different respectively corresponding possible configurations of port-to-segment connections;

selecting a preferred set of port-to-segment connections based on the computer possible changes; and switching the port-to-segment connections to establish said preferred set of connections.

* * * * *